United States Patent [19]

Muramatsu

[11] Patent Number: 5,170,998
[45] Date of Patent: Dec. 15, 1992

[54] FLUID-FILLED ELASTIC MOUNT HAVING MEANS FOR CONTROLLING ELASTIC DEFORMATION OF FLEXIBLE DIAPHRAGM(S) DEFINING EQUILIBRIUM CHAMBER(S)

[75] Inventor: Atsushi Muramatsu, Komaki, Japan

[73] Assignee: Tokai Rubber Industries, Ltd., Japan

[21] Appl. No.: 718,425

[22] Filed: Jun. 20, 1991

[30] Foreign Application Priority Data

Jun. 26, 1990 [JP] Japan .................................. 2-167318

[51] Int. Cl.$^5$ .............................................. F16F 13/00
[52] U.S. Cl. ............................... 267/140.13; 180/312; 248/562; 248/636; 267/219
[58] Field of Search ................. 267/140.1 R, 140.1 A, 267/219; 180/300, 312, 902; 248/562, 636

[56] References Cited

U.S. PATENT DOCUMENTS

| | | | |
|---|---|---|---|
| 4,401,298 | 8/1983 | Eaton et al. | 267/140.1 |
| 4,630,808 | 12/1986 | Ushijima et al. | 267/140.1 |
| 4,657,232 | 4/1987 | West | 267/140.1 |
| 4,756,513 | 7/1988 | Carlson et al. | 267/140.1 |
| 4,893,797 | 1/1990 | Fol et al. | 267/140.1 |
| 4,909,489 | 3/1990 | Doi | 248/562 X |

FOREIGN PATENT DOCUMENTS

| | | | |
|---|---|---|---|
| 55-107142 | 8/1980 | Japan . | |
| 60-220239 | 11/1985 | Japan . | |
| 215141 | 9/1987 | Japan | 267/219 |
| 215143 | 9/1987 | Japan | 267/140.1 |

Primary Examiner—George E. A. Halvosa
Attorney, Agent, or Firm—Parkhurst, Wendel & Rossi

[57] ABSTRACT

A fluid-filled elastic mount including a first and a second support member which are spaced apart from each other in a load-receiving direction, an elastic body for elastically connecting these support members, and a partition structure supported by the second structure. The elastic mount has a pressure-receiving chamber partially defined by the elastic body, and a first and a second equilibrium chamber partically defined by respective first and second flexible diaphragms. The elastic mount further has a member which cooperates with the first diaphragm to define a first air chamber separated from the first equilibrium chamber by the diaphragm, and a pressure control device for applying a selected one of two different pressures to the first diaphragm or the above-described member, so as to selectively permit and inhibit elastic deformation of the first flexible diaphragm. A non-compressible fluid in the mount flows between the pressure-receiving and the first equilibrium chambers through a first orifice passage, and between the pressure-receiving and the second equilibrium chambers through a second orifice passage as well as the first orifice passage.

12 Claims, 6 Drawing Sheets

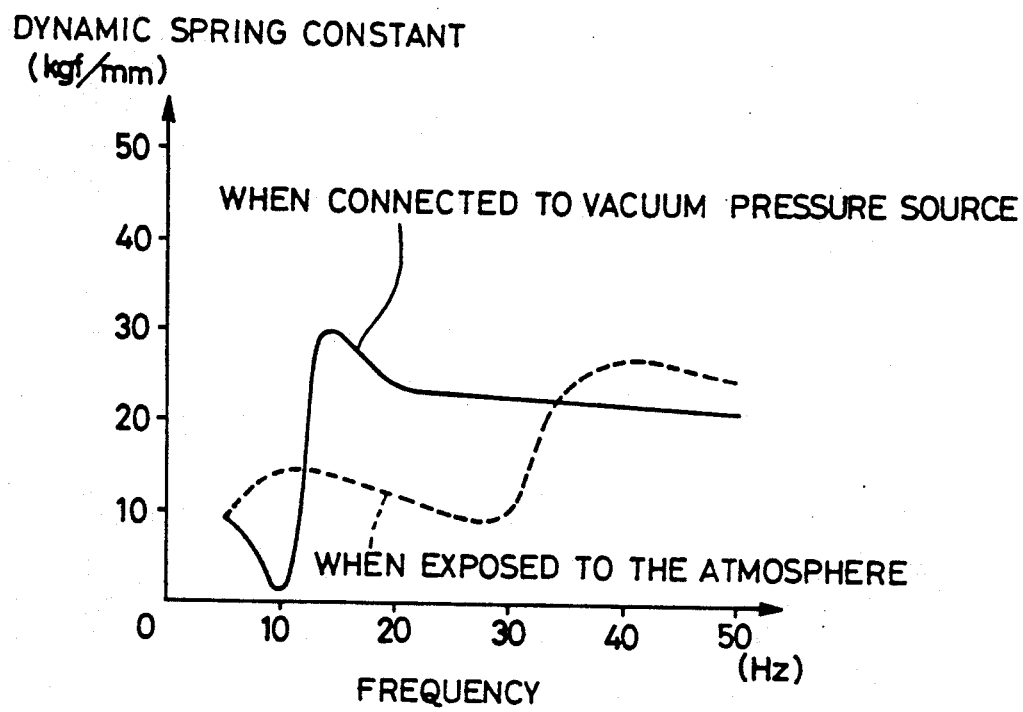
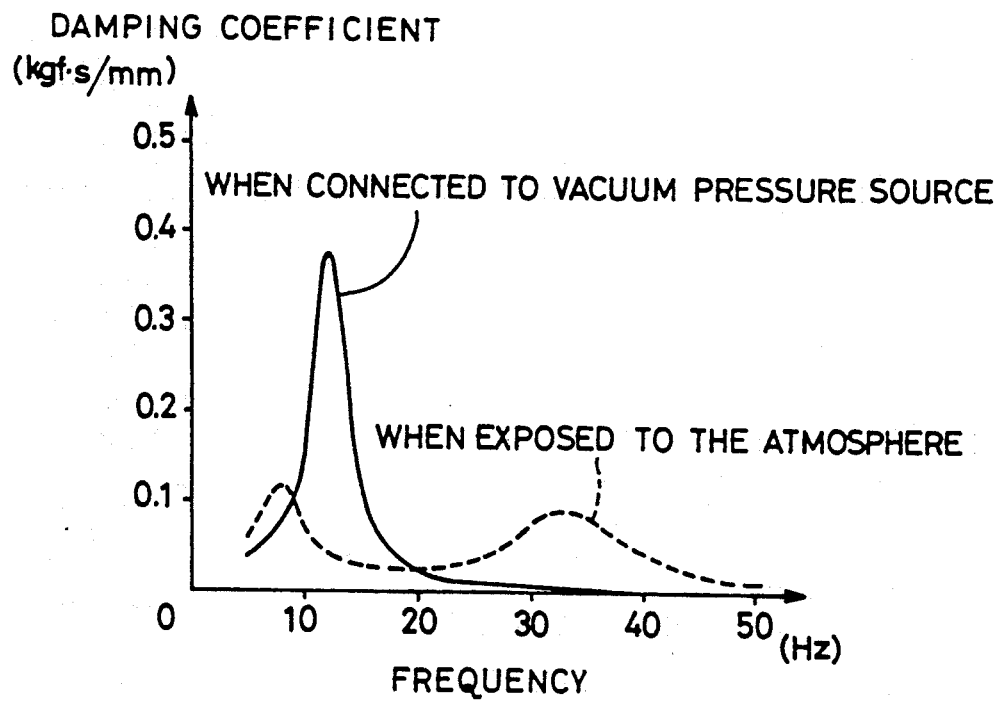

OPEN TO ATMOSPHERE

CONNECTED TO VACUUM SOURCE

FLUID-FILLED ELASTIC MOUNT HAVING MEANS FOR CONTROLLING ELASTIC DEFORMATION OF FLEXIBLE DIAPHRAGM(S) DEFINING EQUILIBRIUM CHAMBER(S)

BACKGROUND OF THE INVENTION

1. Field of the Invention

The present invention relates in general to a fluid-filled elastic mount for damping or isolating vibrations based on flows of a non-compressible fluid contained therein. More particularly, the present invention is concerned with such a fluid-filled elastic mount which is simple in construction, and is capable of exhibiting different vibration damping or isolating characteristics based on the fluid flow through differently tuned orifices, depending upon the type of the vibrations applied thereto.

2. Discussion of the Prior Art

An elastic mount is known as a vibration damping device interposed between two members of a vibration system, for flexibly connecting these two members. As a type of this elastic mount, there is known a so-called fluid-filled elastic mount as disclosed in laid-open Publication No. 55-107142 of unexamined Japanese Patent Application. The elastic mount disclosed in this publication includes a first and a second support structure which are spaced apart from each other in a load-receiving direction and are elastically connected to each other by an elastic body interposed therebetween. The elastic mount further includes a partition member supported by the second support structure so as to extend in a direction substantially perpendicular to the load-receiving direction. A pressure-receiving chamber which is partially defined by the elastic body is formed on one side of the partition member, while a variable-volume equilibrium chamber which is partially defined by a flexible diaphragm is formed on the other side of the partition member. These pressure-receiving and equilibrium chambers are filled with a suitable non-compressible fluid, and communicate with each other by an orifice passage. A pressure of the fluid in the pressure-receiving chamber changes due to elastic deformation of the elastic body upon application of vibrations in the load-receiving direction. The fluid-filled elastic mount damps or isolates the input vibrations based on the resonance of the fluid mass flowing through the orifice passage, more effectively than an elastic mount which relies upon only the elastic property of the elastic body for damping the input vibrations. For this reason, the elastic mount of this type is widely used for motor vehicles, for example, as a mount for mounting the engine on the vehicle body.

Generally, the fluid-filled elastic mount when used as a vehicle engine mount is required to exhibit a high degree of damping capability with respect to relatively low-frequency vibrations, such as engine shake and bounce, and provide a sufficiently low dynamic spring constant with respect to relatively high-frequency vibrations, such as engine idling vibrations and booming noise. However, an improvement in the vibration damping or isolating function of the mount based on the resonance of the fluid mass flowing through the orifice passage can be provided with respect to only the vibrations whose frequencies are in the neighborhood of the frequency to which the orifice passage is tuned. Where the orifice passage is tuned so that the mount exhibits a high damping effect with respect to the low-frequency vibrations, for example, the orifice passage operates as if the passage was substantially closed when the mount receives the vibrations whose frequencies are higher than the tuned frequency of the orifice passage. As a result, the elastic mount suffers from an undesirably increased dynamic spring constant, and from a considerable deterioration of the isolating function with respect to the high-frequency vibrations.

To solve the above-described problem encountered in the known fluid-filled elastic mount, it is proposed to provide two mutually independent orifice passages, one of which is tuned to provide a sufficiently reduced dynamic spring constant to isolate the high-frequency vibrations, and the other of which is tuned to effectively damp the low-frequency vibrations.

The above-indicated one of the two differently tuned orifice passage is tuned so that the resonance frequency of the fluid mass flowing therethrough is higher than that of the fluid mass flowing through the other orifice passage, and so that the flow resistance of the fluid in the one orifice passage is smaller than that of the fluid in the other orifice passage. Therefore, upon application of a vibrational load, the fluid filling the elastic mount tends to flow between the pressure-receiving and equilibrium chambers, only through the above-indicated one orifice passage having the smaller flow resistance, i.e., the orifice passage for isolating the high-frequency vibrations. Consequently, it is rather difficult to ensure a sufficient amount of the fluid flowing through the other orifice passage so as to effectively damp the low-frequency vibrations.

In view of the above drawback of the proposed fluid-filled elastic mount, the applicant of the present application proposed another fluid-filled elastic mount as disclosed in laid-open Publication No. 60-220239 of unexamined Japanese Patent Application, which includes a control valve for selectively opening and closing the above-indicated one orifice passage tuned to the higher resonance frequency, and an actuator for operating the control valve. The control valve is operated by the actuator, so that the above-indicated one orifice passage is automatically opened and closed to permit the elastic mount to exhibit different vibration damping and isolating characteristics, based on the fluid flow through the selected one of the two orifice passages, depending upon the type of the input vibration.

In the thus constructed fluid-filled elastic mount, however, the provision of the control valve disposed in the relevant orifice passage along with the actuator disposed in the elastic mount results in increased structural complexity and a comparatively large size of the elastic mount. Accordingly, the cost of manufacture of the elastic mount is inevitably increased.

SUMMARY OF THE INVENTION

It is therefore an object of the present invention to provide a fluid-filled elastic mount which is simple in construction, and which is capable of selectively exhibiting different vibration damping and isolating characteristics based on flows of a non-compressible fluid through a selected one of two differently tuned orifice passages, depending upon the type of the input vibration.

The above object may be achieved according to the principle of the present invention, which provides a fluid-filled elastic mount comprising: (a) a first support member and a second support member which are respectively fixed to the two members to be flexibly connected, and which are spaced apart from each other in a load-receiving direction in which vibrations are applied to the elastic mount; (b) an elastic body interposed between the first and second support members for elastically connecting the first and second support members; (c) a partition structure supported by the second support member so as to extend in a direction substantially perpendicular to the load-receiving direction, (d) the elastic body at least partially defining a pressure-receiving chamber disposed on one of opposite sides of the partition structure on the side of the first support member, the pressure-receiving chamber being filled with a non-compressible fluid, a pressure of the fluid in the pressure-receiving chamber changing due to elastic deformation of the elastic body upon application of the vibrations in the load-receiving direction; (e) means for defining a first equilibrium chamber disposed on the other side of the partition structure remote from the pressure-receiving chamber and filled with the non-compressible fluid, the means for defining a first equilibrium chamber including a first flexible diaphragm which is elastically deformable so as to permit a volumetric change of the first equilibrium chamber to absorb a change in a pressure of the fluid within the first equilibrium chamber; (f) means for defining a first orifice passage which communicates with the pressure-receiving chamber and the first equilibrium chamber so as to permit flow of the fluid therebetween; (g) a member cooperating with the first flexible diaphragm to define therebetween a first air chamber separated from the first equilibrium chamber by the first flexible diaphragm, for permitting elastic deformation of the first flexible diaphragm; (h) pressure control means for applying a selected one of two different pressures to one of the first flexible diaphragm and the member cooperating with the first flexible diaphragm, so as to selectively permit and inhibit the elastic deformation of the first flexible diaphragm; (i) means for defining a second equilibrium chamber disposed on the other side of the partition structure remote from the pressure-receiving chamber and formed independently of the first equilibrium chamber, the second equilibrium chamber being filled with the non-compressible fluid, the means for defining a second equilibrium chamber including a second flexible diaphragm which is elastically deformable so as to permit a volumetric change of the second equilibrium chamber to absorb a change in a pressure of the fluid within the second equilibrium chamber; and (j) means for defining a second orifice passage which communicates with the pressure-receiving chamber via the first orifice passage, and which cooperates with the first orifice passage to permit flows of the fluid between the pressure-receiving chamber and the second equilibrium chamber.

In the fluid-filled elastic mount of the present invention constructed as described above, the pressure control means is operated so that a selected one of two different pressures is applied to the first flexible diaphragm, or the member cooperating with the first flexible diaphragm to define the first air chamber. As a result, the elastic deformation of the first flexible diaphragm is selectively permitted and inhibited so as to cause the non-compressible fluid to flow through the first and second orifice passages, respectively. The first and second orifice passages are usually tuned to different frequency ranges of vibrations. Thus, the vibration damping or isolating characteristics of the present elastic mount can be changed by selecting the orifice passage through which the fluid mainly flows, depending upon the type of the input vibrations. Since the pressure control means may be almost entirely disposed outside the body of the elastic mount, the present elastic mount is considerably simple in construction, without requiring a control valve, an actuator and other devices incorporated within the elastic mount.

Namely, the present fluid-filled elastic mount having a simple construction is capable of providing different vibration damping and isolating effects for the input vibrations in different frequency ranges, based on the resonance of the fluid flowing through the selected one of the two differently tuned orifice passages.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIGS. 4 and 5 are graphs indicating the results of measurement of vibration damping/isolating characteristics of the engine mount of FIG. 1 when connected to the vacuum pressure source and when exposed to the atmosphere;

DETAILED DESCRIPTION OF THE PREFERRED EMBODIMENTS

Figure 1:
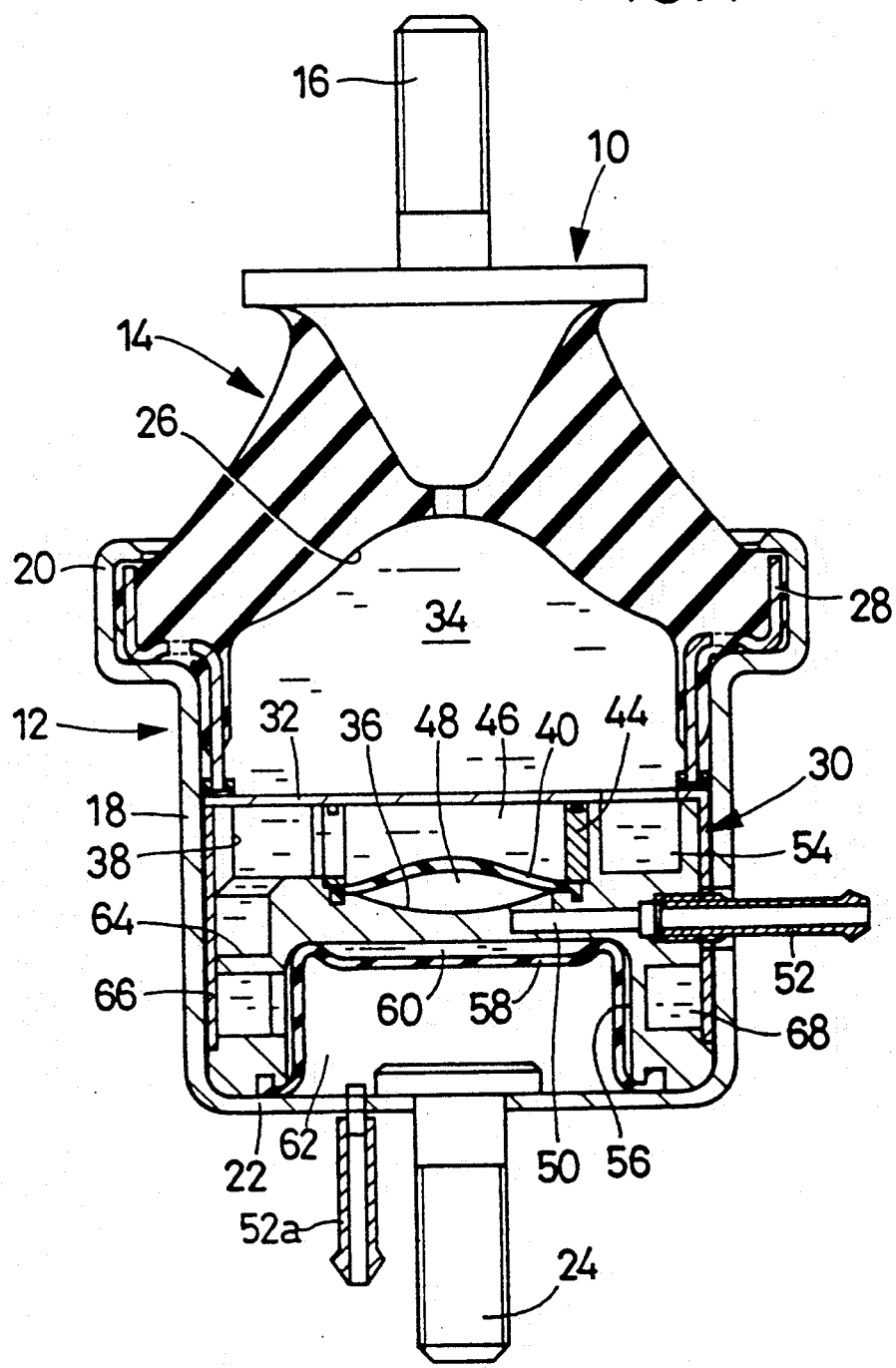
FIG. 1 is an elevational view in axial cross section of one embodiment of a fluid-filled elastic mount of the present invention in the form of an engine mount for a motor vehicle.
Figure 2:
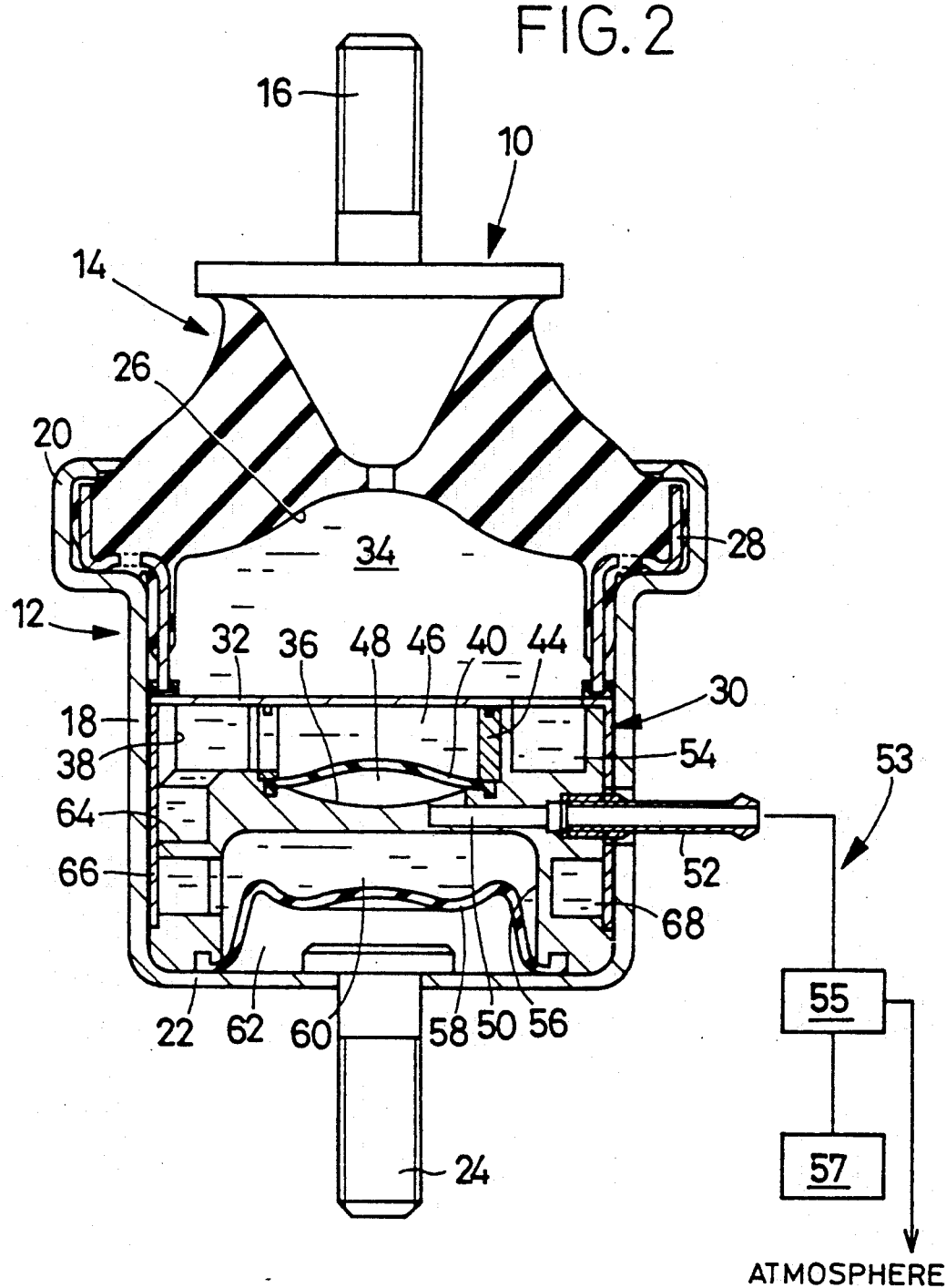
FIG. 2 is an elevational view in axial cross section of the engine mount of FIG. 1 as installed in position on the vehicle, when a first air chamber of the mount is exposed to the atmosphere.

Referring first to FIG. 1 showing the vehicle engine mount as one embodiment of the fluid-filled elastic mount of this invention, reference numerals 10 and 12 denote a first and a second rigid support member, respectively. These first and second support members 10, 12 are opposed to each other and spaced apart from each other by a suitable distance, in a load-receiving direction in which vibrations are received by the engine mount. Between the first and second support members 10, 12, there is formed an elastic body 14 so that the two members 10, 12 are elastically connected to each other by the elastic body 14. The instant engine mount is installed on a motor vehicle such that the first support member 10 is fixed to an engine unit of the vehicle while the second support member 12 is fixed to a body of the vehicle. Thus, the engine unit is flexibly mounted on the vehicle body in a vibration damping or isolating manner. With the engine mount installed in position on the vehicle as described above, the weight of the engine unit acts on the mount in the direction in which the first and second support members 10, 12 are opposed to each other, whereby the elastic body 14 is elastically deformed or contracted so that the first and second support members 10, 12 are moved toward each other from the pre-installation positions by a suitable distance in the above-described direction, as shown in FIG. 2. The instant engine mount is adapted to damp or isolate the input vibrations which are applied primarily in the direction (vertical direction as viewed in FIG. 1) in which the first and second support members 10, 12 are opposed to each other, that is, the above-indicated load-receiving direction.

More specifically, the first support member 10 is a metallic member having a generally truncated conical shape. A mounting bolt 16 is formed integrally with the first support member 10 such that the bolt 16 extends in the load-receiving direction from a central portion of the large-diameter end face of the first support member 10, axially outwardly of the engine mount. The engine mount is fixed to the engine unit of the vehicle through the mounting bolt 16.

On the other hand, the second support member 12 is a generally cup-shaped metallic member which consists of a bottom wall portion 22 formed at one axial end thereof, an open end portion 20 formed at the other axial end, and a cylindrical portion 18 between these portions 20, 22. The open end portion 20 has a diameter larger than that of the cylindrical portion 18. A mounting bolt 24 is formed integrally with the second support member 12 such that the bolt 24 extends in the load-receiving direction from a central portion of the bottom wall portion 22, axially outwardly of the engine mount. The engine mount is fixed to the vehicle body through the mounting bolt 24.

The first and second support members 10, 12 are positioned concentrically or coaxially with each other, with a suitable axial distance therebetween, such that the cup-shaped second support member 12 is open facing the small-diameter end face of the first support member 10. Between these two support members 10, 12, there is formed by vulcanization the elastic body 14 indicated above.

The elastic body 14 has a generally truncated conical shape, and is formed with a cavity 26 which is open in its large-diameter end face on the side of the second support member 12. The elastic body 14 is bonded by vulcanization at its small-diameter end face to the outer surface of the first support member 10. To the outer circumferential surface of the large-diameter end portion of the elastic body 14, there is secured by vulcanization a stepped cylindrical retainer member 28 made of metal. Thus, the first support member 10, elastic body 14 and retainer member 28 are formed into an integral unit by means of vulcanization. The retainer member 28 and the large-diameter end portion of the elastic body 14 are received in the second support member 12, such that the open end portion 20 of the second support member 12 is caulked against the retainer member 28. Thus, the elastic body 14 is interposed between the first and second support members 10, 12 so as to elastically connect these support members 10, 12 to each other.

In the bottom portion of the second support member 12, there are accommodated a thick-walled, rigid orifice-defining member 30 having a generally disc-like shape as a whole, and a thin-walled partition disc 32 which is superposed on the upper surface of the orifice-defining member 30. These orifice-defining member 30 and partition disc 32 are sandwiched by and between the retainer member 28 and the bottom wall portion 22 of the second support member 12, in the axial direction of the engine mount, such that these members 30, 32 are fixedly fitted in the second support member 12.

In this arrangement, the partition disc 32 is located at an axially intermediate portion in the interior of the second support member 12, and extends in a direction substantially perpendicular to the direction in which the first and second support members 10, 12 are opposed to each other, i.e., the load-receiving direction of the mount. Thus, the partition disc 32 divides the interior of the second support member 12, into an upper section on the side of the open end portion 20 and a lower section on the side of the bottom wall portion 22.

The upper section of the interior of the second support member 12 is partially defined by the inner wall of the elastic body 14 defining the cavity 26, whereby a pressure-receiving chamber 34 is formed on one of opposite sides of the partition disc 32 on the side of the first support member 10. The pressure-receiving chamber 34 is filled with a suitable non-compressible fluid, such as water, alkylene glycol, polyalkylene glycol, or silicone oil. When vibrations are applied between the first and second support members 10, 12, a pressure of the fluid in the pressure-receiving chamber 34 changes as a result of a volumetric change of the chamber 34 due to elastic deformation of the elastic body 14.

The orifice-defining member 30 is accommodated in the lower section of the interior of the second support member 12 on the side of the bottom wall portion 22. The orifice-defining member 30 is formed with a first recess 36 which is open in a central portion of the axial end face thereof on which the partition disc 32 is superposed. With the opening of the first recess 36 closed by the partition disc 32, there is defined an enclosure between the orifice-defining member 30 and the partition disc 32. A thin-walled first flexible diaphragm 40 made of rubber is provided within the first recess 36, so as to divide the enclosure into an upper section on the side of the partition disc 32, and a lower section on the side of the bottom wall of the recess 36. In FIGS. 1 and 2, reference numeral 44 denotes an annular retainer member 44 which is adapted to force the outer periphery of the first diaphragm 40 against the bottom wall of the first recess 36, so as to assure fluid-tightness between the diaphragm 40 and the orifice-defining member 30.

The above-indicated upper section of the first recess 36 on the side of the partition disc 32 serves as a first variable-volume equilibrium chamber 46 which is filled with the non-compressible fluid as described above. The first equilibrium chamber 46 will not undergo a pressure change upon application of vibrations to the elastic mount, since the pressure change is absorbed by a volumetric change of the chamber 46 which occurs due to elastic deformation or displacement of the first diaphragm 40.

The lower section of the first recess 36 on the side of its bottom wall serves as a first air chamber 48 which functions to allow the first diaphragm 40 to deform when a fluid pressure is applied to the first equilibrium chamber 46. In the present embodiment, the first air chamber 48 is defined by and between the first flexible diaphragm 40 and a rigid member in the form of the orifice-defining member 30.

The first air chamber 48 communicates with an air conduit 53, through an air passage 50 formed through the orifice-defining member 30, and a connector 52 which is screwed into an open end portion of the air passage 50. With the engine mount installed in position as shown in FIG. 2, the air conduit 53 is connected at one end to the connector 52, and at the other end to a vacuum pressure source 57 via a switch valve 55. The vacuum pressure source 57 serves to provide a sub-atmospheric pressure which is lower than the atmospheric pressure. The switch valve 55 is selectively placed in a first position for communication of the first air chamber 48 with the atmosphere, and a second position for communication of the air chamber 48 with the vacuum pressure source 57, so that a selected one of the atmospheric pressure and the sub-atmospheric pressure is applied to the first air chamber 48. Optionally, second pressure control means can be connected to the second air chamber 62 via connector 52a.

Figure 3:
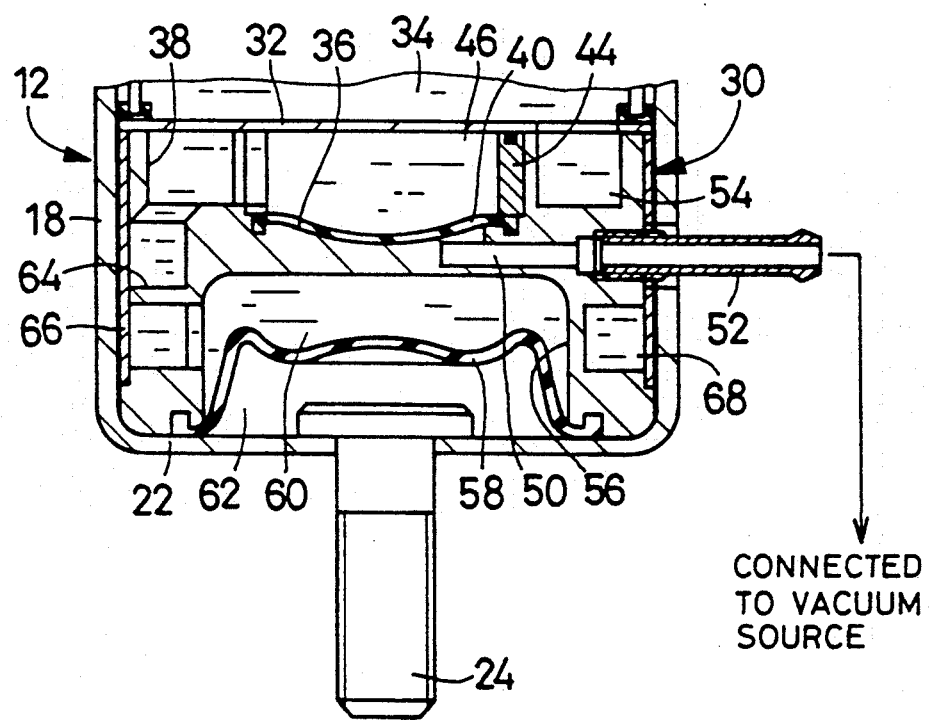
FIG. 3 is a fragmentary cross sectional view of the engine mount of FIG. 1, when the first air chamber of the mount is connected to a vacuum pressure source.

When the switch valve 55 is placed in the first position, that is, when the first air chamber 48 is open to the atmosphere, the flexible diaphragm 40 is placed in an operative position in which the air chamber 48 allows the elastic deformation of the first diaphragm 40, to thereby accommodate the volumetric change in the first equilibrium chamber 46. When the switch valve 55 is placed in the second position, that is, when the first air chamber 48 is connected to the vacuum pressure source 57, the first diaphragm 40 is drawn or sucked onto the inner surface of the bottom wall of the first recess 36, whereby the first air chamber 48 is substantially eliminated, as shown in FIG. 3. In this inoperative position, the first diaphragm 40 is prevented from being freely deformed so as to accommodate the volumetric change in the first equilibrium chamber 46. It will be understood from the above description of the instant embodiment that the air passage 50, connector 52, air conduit 53, switch valve 55, and vacuum pressure source 57 constitute pressure control means for applying a selected one of two different pressures to the first air chamber to apply the selected pressure to the flexible diaphragm 40, so as to selectively permit and inhibit the elastic deformation of the first diaphragm 40.

The orifice-defining member 30 further has a first groove 38 which is formed around the first recess 36 so as to extend in the circumferential direction over not longer than one round of the member 30. With the opening of the first groove 38 closed by the partition disc 32, there is defined a first orifice passage 54 which communicates at one end thereof with the pressure-receiving chamber 34 and at the other end with the first equilibrium chamber 46. The first orifice passage 54 therefore maintains fluid communication between the two fluid chambers 34, 46.

The orifice-defining member 30 is further formed with a second recess 56 which is open in a central portion of the axial end face thereof which contacts the bottom wall portion 22 of the second support member 12. With the opening of the second recess 56 closed by the bottom wall portion 22 of the second support member 12, there is defined an enclosure between the orifice-defining member 30 and the bottom wall portion 22. A thin-walled second flexible diaphragm 58 made of rubber is provided within the second recess 56, so as to divide the enclosure into an upper section on the side of the bottom wall of the recess 56, and a lower section on the side of the bottom wall portion 22. The second diaphragm 58 is gripped at its outer periphery by and between a portion of the orifice-defining member 30 which defines the opening of the second recess 56, and the corresponding portion of the bottom wall portion 22.

The above-indicated upper section of the second recess 56 on the side of its bottom wall serves as a second variable-volume equilibrium chamber 60 which is filled with the non-compressible fluid as described above. The second equilibrium chamber 60 will not undergo a pressure change upon application of vibrations to the elastic mount, since the pressure change is absorbed by a volumetric change of the chamber 60 which occurs due to elastic deformation or displacement of the second diaphragm 58. The lower section of the second recess 56 on the side of the bottom wall portion 22 serves as a second air chamber 62, which functions to allow the second diaphragm 58 to deform when a fluid pressure is applied to the second equilibrium chamber 60.

The orifice-defining member 30 further has a second groove 64 which is formed around the second recess 56 so as to extend in a generally spiral fashion over at least one round of the member 30, such that the groove 64 is open on the outer circumferential surface of the member 30. The opening of the second groove 64 is closed by a thin-walled sleeve 66 fitted on the orifice-defining member 30, to thereby provide a second orifice passage 68 which communicates at one end thereof with an open end portion of the first orifice passage 54 which is open to the first equilibrium chamber 46, and at the other end with the second equilibrium chamber 60. The second orifice passage 68 therefore communicates via the first orifice passage 54 with the second equilibrium chamber 60.

Since the second orifice passage 68 is connected in series with the first orifice passage 54 at its portion open to the first equilibrium chamber 46, the second orifice passage 68 cooperates with the first orifice passage 54 to achieve fluid communication between the pressure-receiving chamber 34 and the second equilibrium chamber 60. Namely, the fluid in the elastic mount is allowed to flow between the pressure-receiving chamber 34 and second equilibrium chamber 60, through the first and second orifice passages 54, 68.

As is apparent from FIGS. 2 and 3, the second orifice passage 68 has a smaller cross sectional area and a longer circumferential length than the first orifice passage 54. That is, the ratio of the cross sectional area to the length of the second orifice passage 68 is smaller than that of the first orifice passage 54. Accordingly, the resonance frequency of the fluid flowing through the second orifice passage 68 is determined to be lower than that of the fluid flowing through the first orifice passage 54. In the instant embodiment, in particular, the first orifice passage 54 is tuned so that the engine mount exhibits a sufficiently reduced dynamic spring constant with respect to the input vibrations in a relatively high frequency range, such as engine idling vibrations, based on resonance of a mass of the fluid flowing through the first orifice passage 54. On the other hand, the second orifice passage 68 is tuned so that the engine mount is able to effectively damp the input vibrations in a relatively low frequency range, such as engine shake or bounce, based on the resonance of a mass of the fluid flowing through the second orifice passage 68.

In the thus constructed engine mount as installed in place as shown in FIG. 2, upon application of vibrations between the first and second support members 10, 12, the non-compressible fluid is forced to flow between the pressure-receiving chamber 34 and the first and second equilibrium chambers 46, 60, through the first and second orifice passages 54, 68, based on a pressure difference between the pressure-receiving chamber 34 and the two equilibrium chambers 46, 60. In the instant embodiment, the fluid is forced to flow through either the first orifice passage 54 alone or the first and second orifice passages 54, 68, by placing the switch valve 55 selectively in the first position in which the fist air chamber 48 is open to the atmosphere, and the second position in which the air chamber 48 is connected to the vacuum pressure source 57. For the low-frequency vibrations, the resonance of the fluid mass in the first orifice passage 54 is almost negligible, and the damping or isolating effect for the low-frequency vibrations depends largely on the resonance of the fluid mass in the second orifice passage 68. Thus, the instant engine mount exhibits desired vibration damping or isolating characteristics, depending upon the type of the vibrations applied thereto, based on the resonance of the fluid mass in the first or second orifice passage 54, 68.

More specifically described, when the engine mount receives high-frequency vibrations such as engine idling vibrations, which should be isolated by the fluid flow through the first orifice passage 54, the switch valve 55 is operated to the first position for exposing the first air chamber 48 to the atmosphere, as shown in FIG. 2. As a result, the first air chamber 48 is adapted to allow the elastic deformation of the first diaphragm 40 to thereby permit a volumetric change in the first equilibrium chamber 46, so that effective flow of the fluid occur between the pressure-receiving and first equilibrium chambers 34, 46, through the first orifice passage 54. Consequently, the engine mount provides a sufficiently reduced dynamic spring constant with respect to the high-frequency vibrations, based on the resonance of the fluid flowing through the first orifice passage 54. In this condition, a volumetric change in the second equilibrium chamber 60 may be also allowed by the elastic deformation of the second diaphragm 48. However, the fluid is less likely to flow between the pressure-receiving and the second equilibrium chambers 34, 60, because of relatively large resistance to the fluid flow through the second orifice passage 68 whose ratio of the cross sectional area to the length is smaller than that of the first orifice passage 54. In substance, the high-frequency vibrations cause the fluid to effectively flow only through the first orifice passage 54, between the pressure-receiving and first equilibrium chambers 34, 46.

On the other hand, when the engine mount receives low-frequency vibrations such as engine shake or bounce, which should be damped by fluid flow through the second orifice passage 68, the switch valve 55 is operated to the second position for connecting the first air chamber 48 to the vacuum pressure source 57. As a result, the first diaphragm 48 is drawn onto the bottom wall of the first recess 36, as shown in FIG. 3, and is therefore prevented from being freely deformed so as to accommodate a volumetric change in the first equilibrium chamber 46. This means that a pressure change in the first equilibrium chamber 46 is not absorbed by the elastic deformation of the first diaphragm 48. Consequently, the fluid which is introduced from the pressure-receiving chamber 34 into the first orifice passage 54 is forced to flow into the second equilibrium chamber 60 through the second orifice passage 68. In this manner, effective flow of the fluid take place between the pressure-receiving chamber 34 and the second equilibrium chamber 60, through the first and second orifice passages 54, 68. Thus, the engine mount is able to effectively damp the low-frequency vibrations, based on the resonance of the fluid flowing through the second orifice passage 68.

In the manners as described above, the present elastic mount can exhibit different vibration damping or isolating characteristics depending upon the type of the input vibrations, by simply controlling the switch valve 55 according to the condition of the vehicle. More specifically, the switch valve 55 is controlled such that the first air chamber 48 is connected to the vacuum pressure source 57 while the vehicle is running, and such that the first air chamber 48 is exposed to the atmosphere while the vehicle is at a stop with the engine idling. In this arrangement, the engine mount provides a sufficiently high damping effect with respect to the engine shake and other low-frequency vibrations usually generated during running of the vehicle, based on the resonance of the fluid mass flow through the second orifice passage 68. Further, the elastic mount provides a sufficiently low dynamic spring constant with respect to the engine idling vibrations generated while the vehicle is parked with the engine idling, based on the resonance of the fluid mass flow through the first orifice passage 54. Thus, the engine mount according to the present invention assures significantly improved driving comfort of the vehicle.

In the graphs of FIGS. 4 and 5, there are shown some results of measurement of the vibration damping and isolating characteristics with respect to the engine mount constructed as described above, which characteristics are selectively exhibited by operation of the switch valve 55. It will be understood from the results that the present engine mount can selectively provide a considerably high damping effect for the input vibrations in a relatively low frequency range around 12Hz, such as engine shakes, and an effectively lowered dynamic spring constant for the input vibrations in a relatively high frequency range around 25-30Hz, such as engine idling vibrations.

In the engine mount as described above, in particular, the non-compressible fluid in the mount is forced to flow selectively through the first orifice passage 54 alone or the first and second orifice passages 54, 68, by simply operating the switch valve 55 so as to change the pressure in the first air chamber 48. Accordingly, the present engine mount is comparatively simple in construction since the pressure control means (52, 53, 55, 57) for applying a selected one of two different pressures to the first air chamber 48 to provide the two different operating characteristics is almost entirely disposed outside the body of the engine mount. That is, it is not necessary to provide the engine mount with a control valve for selectively opening and closing the relevant orifice passage and an actuator for operating the control valve, which control valve and actuator are incorporated within the structure of the engine mount.

When the concept of the present invention is applied to a vehicle engine mount as in the illustrated embodiment, the intake pressure of the vehicle engine can be readily utilized as the vacuum pressure applied to the first air chamber 48.

Figure 6:
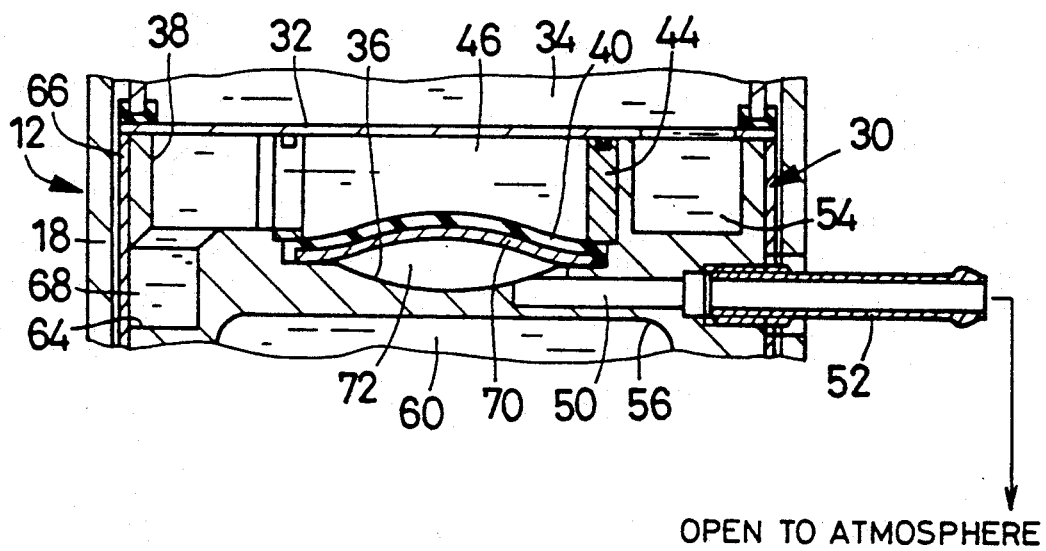
FIG. 6 is a fragmentary cross sectional view of another embodiment of the engine mount of the invention, when an air-pressure receiving chamber of the mount is exposed to the atmosphere.
Figure 7:
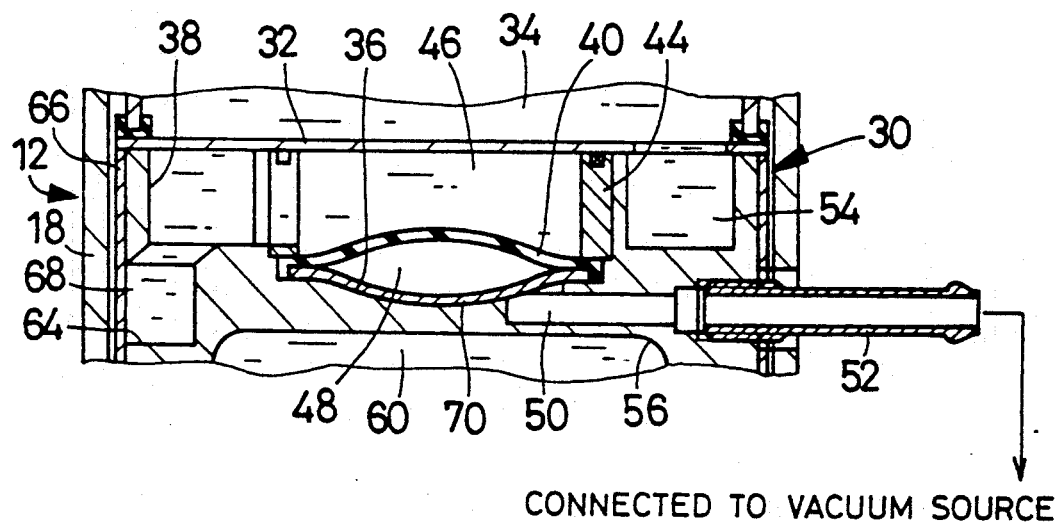
FIG. 7 is a fragmentary cross sectional view of the engine mount of FIG. 6, when the air-pressure receiving chamber of the mount is connected to a vacuum pressure source.

Referring next to FIGS. 6 and 7, there is illustrated another embodiment of the present invention, which is identical with the preceding embodiment except the arrangement for selectively permitting and inhibiting the elastic deformation of the first flexible diaphragm. In the interest of brevity, the same reference numerals as used in the preceding embodiment will be used in the instant embodiment to identify structurally and/or functionally corresponding elements, and no detailed description of these elements will be provided.

The engine mount of the instant embodiment has a resilient member in the form of a thin-walled coned disc or belleville spring 70 which is disposed in the first recess 36 of the orifice-defining member 30. The coned disc spring 70 has a first position for contact with the lower surface of the first flexible diaphragm 40 so as to face the bottom wall of the recess 36 as shown in FIG. 6, and a second position in which the spring 70 is spaced apart from the diaphragm 40 as shown in FIG. 7. This coned disc spring 70 is retained along with the first diaphragm 40, with their peripheral portions fluid-tightly gripped by and between the retainer member 44 and the orifice-defining member 30.

The coned disc spring 70 is formed in spherical configuration such that the spring 70 is normally convexed toward the first diaphragm 40. When the coned disc spring 70 is installed in position in the engine mount, the convexity of the spring 70 exactly follows that of the first diaphragm 40, with the upper surface of the spring 70 in contact with the lower surface of the diaphragm 40, as shown in FIG. 6.

The orifice-defining member 30 is formed with a through-hole (not shown) which communicates with the exterior space of the mount and the interface between the coned disc spring 70 and the first diaphragm 40, such that the interface is always exposed to the atmosphere in the exterior space. In this condition, when the coned disc spring 70 is deformed and displaced to the second position against the biasing force thereof, as shown in FIG. 7, a suitable volume of space is formed between the first diaphragm 40 and the spring 70, which space communicates with the atmosphere and serves as the first air chamber 48 for permitting the elastic deformation of the first diaphragm 40.

When the coned disc spring 70 and the first diaphragm 40 are held in close contact with each other with the spring 70 placed in the first position as shown in FIG. 6, an air-tight air-pressure receiving chamber 72 is defined between the spring 70 and the bottom wall of the first recess 36. This air-pressure receiving chamber 72 is connected via the switch valve 55 selectively to the atmosphere and the vacuum pressure source 57, depending upon the operated position of the switch valve 55. Namely, in the instant embodiment, a selected one of the atmospheric pressure and the sub-atmospheric pressure from the vacuum pressure source 57 acts on the resilient coned disc spring 70 through the air-pressure receiving chamber 72, to move the spring 70 between the first and second positions of FIGS. 6 and 7 to selectively inhibit and permit the elastic deformation of the first flexible diaphragm 40.

In the instant engine mount constructed as described above, while the air-pressure receiving chamber 72 is exposed to the atmosphere, the coned disc spring 70 is held in close contact with the first diaphragm 40, whereby the first air chamber 48 is substantially eliminated, that is, the volume of the air chamber 48 is zeroed, as shown in FIG. 6. In this condition, the coned disc spring 70 prevents the first diaphragm 40 to be freely deformed so as to absorb pressure changes of the fluid in the first equilibrium chamber 46. When the air-pressure receiving chamber 72 is connected to the vacuum pressure source 57, on the other hand, the coned disc spring 70 is drawn onto the bottom wall of the first recess 36, as shown in FIG. 7, and the first air chamber 48 having a suitable volume appears between the first diaphragm 40 and the coned disc spring 70 so as to permit the elastic deformation of the first diaphragm 40.

Accordingly, the thus constructed engine mount is capable of selectively permitting and inhibiting the elastic deformation of the first diaphragm 40, by operating the switch valve 55 to apply a selected one of the atmospheric pressure and sub-atmospheric pressure to the air-pressure receiving chamber 72. With this control of the first diaphragm 40, the instant engine mount, as in the first embodiment, is capable of selectively exhibiting two different operating characteristics, i.e., a high vibration isolating effect based on fluid flows through the first orifice passage 54, and a high vibration damping effect based on fluid flows through the second orifice passage 68.

In the instant embodiment, in particular, when the air-pressure receiving chamber 72 is subject to the sub-atmospheric pressure from the vacuum pressure source, the elastic deformation of the first diaphragm 40 is allowed to absorb the pressure change of the fluid in the first equilibrium chamber 46, so that the engine mount can effectively isolate the engine idling vibrations, based on the fluid flows through the first orifice passage 54. This is contrary to the arrangement of the first embodiment in which the sub-atmospheric pressure is used to inhibit the elastic deformation of the first diaphragm 48. Therefore, the instant embodiment is advantageous in that a relatively large intake pressure of the vehicle engine which is generated during its idling operation can be effectively utilized as the sub-atmospheric pressure to be applied to the air-pressure receiving chamber 72. Thus, the instant engine mount does not require a large-sized pressure accumulator or the like for providing the sub-atmospheric pressure as described above.

While the present invention has been described in its presently preferred embodiments with a certain degree of particularity, for illustrative purpose only, it is to be understood that the invention is not limited to the details of the illustrated embodiments, but may be embodied otherwise.

For example, the constructions and configurations of the first and second orifice passages 54, 68 are by no means limited to those of the illustrated embodiments, but may be suitably modified according to the required vibration damping or isolating characteristics of the elastic mount.

In the illustrated embodiments, the second orifice passage 68 is connected directly to the open end portion of the first orifice passage 54 which is open to the first equilibrium chamber 46. However, the second orifice passage 68 may be connected to the first orifice passage 68 through the first equilibrium chamber 46.

In the illustrated embodiment, the second orifice passage 68 is suitably tuned so that the engine mount can effectively damp the input vibrations based on the resonance of the fluid mass flow through the second orifice passage 68, when the fluid in the mount is forced to flow between the pressure-receiving chamber 34 and the second equilibrium chamber 60. However, the ratio of the cross sectional areas of the first and second orifice passages and the manner of connecting these orifice passages may be determined so that the first and second orifice passages connected in series with each other may function as a single orifice passage, through which the fluid is forced to flow between the pressure-receiving chamber 34 and the second equilibrium chamber 60 upon application of low-frequency vibrations. In this case, the elastic mount is able to effectively damp the low-frequency vibrations based on the resonance of the fluid flow mass through the above-indicated single orifice passage.

While the pressure control means is adapted to change the pressure in the air chamber 48 or in the air-pressure receiving chamber 72 to move the diaphragm 40 or spring 70, by connecting the relevant chamber 48, 72 selectively to the atmosphere or the vacuum pressure source 57 in the illustrated embodiments, the pressure control means according to the invention may use a pressure source for applying a pressure higher than the atmospheric pressure, in addition to the vacuum pressure source. In the first embodiment, for example, the first air chamber 48 may be connected to the above-indicated pressure source instead of being exposed to the atmosphere, so that a predetermined level of pressure (higher than the atmospheric pressure) is applied to the air chamber 48. Alternatively, the first air chamber 48 may be fluid-tightly closed such that the pressure in the air chamber is substantially equal to the atmospheric pressure. In the above two cases, the compression of the air present in the first air chamber 48 permits elastic deformation of the first flexible diaphragm 40.

It is also possible to provide another pressure control means for selectively permit and inhibit the elastic deformation of the second flexible diaphragm 58 which allows a volumetric change of the second equilibrium chamber 60, in addition to the above-described pressure control means for the first flexible diaphragm 40. In this case, the elastic deformation of the second diaphragm 58 is inhibited when the input vibrations should be isolated based on the fluid flow through the first orifice passage 54, so that a sufficient amount of the fluid may be forced to flow between the pressure-receiving chamber 34 and the first equilibrium chamber 46, assuring a significantly reduced dynamic spring constant of the mount based on the fluid flows through the first orifice passage 54.

While the illustrated embodiments of the invention are used as engine mounts for a motor vehicle, the principle of the present invention is equally applicable to any fluid-filled elastic mounts other than the engine mount, for example, to a vehicle body mount and a cab mount for the vehicle, and even applicable to fluid-filled vibration damping/isolating components used for various devices or equipment other than those for motor vehicles.

It is to be understood that the present invention may be embodied with various other changes, modifications and improvements, which may occur to those skilled in the art, without departing from the scope of the invention defined in the following claims.

What is claimed is:

1. A fluid-filled elastic mount for flexibly connecting two member, comprising:
    a first support member and a second support member which are respectively fixed to the two members to be flexibly connected, and which are spaced apart from each other in a load-receiving direction in which vibrations are applied to the elastic mount;
    an elastic body interposed between said first and second support members for elastically connecting the first and second support members;
    a partition structure supported by said second support member so as to extend in a directions substantially perpendicular to said load-receiving direction;
    said elastic body at least partially defining a pressure-recieving chamber disposed on one of opposite sides of said partition structure on the side of said first support member, said pressure-receiving chamber being filled with a non-compressible fluid, a pressure of said fluid in said pressure-receiving chamber changing due to elastic deformation of said elastic body upon application of the vibrations in said load-receiving direction;
    means for defining a first equilibrium chamber disposed on the other side of said partition structure remote from said pressure-receiving chamber and filled with said non-compressible fluid, said means for defining a first equilibrium chamber including a first flexible diaphragm which is elastically deformable so as to permit a volumetric change of said first equilibrium chamber to absorb a change in a pressure of said fluid within said first equilibrium chamber;
    means for defining a first orifice passage which communicates with said pressure-receiving chamber and said first equilibrium chamber so as to permit flow of said fluid therebetween;
    a member cooperating with said first flexible diaphragm to define therebetween a first air chamber separated from said first equilibrium chamber by said first flexible diaphragm, for permitting elastic deformation of the first flexible diaphragm;
    pressure control means for applying a selected one of two different pressures to one of said first flexible diaphragm and said member cooperating with said first flexible diaphragm, and for moving the first flexible diaphragm between a first position spaced from said member and a second position fully contacting said member;
    means for defining a second equilibrium chamber disposed on said other side of said partition structure remote form said pressure-receiving chamber and formed independently of said first equilibrium chamber, said second equilibrium chamber being filled with said non-compressible fluid, said means for defining a second equilibrium chamber including a second flexible diaphragm which is elastically deformable so as to permit a volumetric change of said second equilibrium chamber to absorb a change in a pressure of said fluid within said second equilibrium chamber; and
    means for defining a second orifice passage which communicates with said pressure-receiving chamber via said first orifice passage, and which cooperates with said first orifice passage to permit flow of said fluid between said pressure-receiving chamber and said second equilibrium chamber.

2. A fluid-filled elastic mount according to claim 1, wherein said first orifice passage has a ratio of a cross sectional area thereof to a length thereof, which ratio is higher than that of said second orifice passage.

3. A fluid-filled elastic mount according to claim 1, wherein said member cooperating with said first flexible diaphragm consists of a rigid member, and said pressure control means includes switching means which is operable between a first position for applying one of said two different pressures to said first air chamber to place said first flexible diaphragm in said first position, to permit the elastic deformation of said first flexible diaphragm, and a second position for applying the other pressure to said first air chamber to place said first flexible diaphragm in said second position, to inhibit the elastic deformation of said first flexible diaphragm, said one pressure being higher than said other pressure, said non-compressible fluid flowing substantially exclusively through said first orifice passage when said switching means is placed in said first position, and through said second orifice passage when said switching means is placed in said second position.

4. A fluid-filled elastic mount according to claim 3, wherein said pressure control means further includes a vacuum pressure source for providing said first air chamber with a sub-atmospheric pressure as said other pressure when said switching means is placed in said second position, said first air chamber being held in communication with an atmosphere having an atmospheric pressure as said one pressure when said switching means is placed in said first position.

5. A fluid-filled elastic mount according to claim 3, wherein said member cooperating with said first flexible diaphragm has an air passage communicating with said first air chamber, said pressure control means including an air conduit connected to said air passage for applying the selected one of two different pressures to said first air chamber.

6. A fluid-filled elastic mount according to claim 5, wherein said air conduit is connected to said air passage through a connector having an end portion fitted in said air passage.

7. A fluid-filled elastic mount according to claim 1, further comprising:
  means for defining a second air chamber which is separated from said second equilibrium chamber by said second flexible diaphragm, for permitting elastic deformation of the second flexible diaphragm; and
  another pressure control means for applying a selected one of two different pressures to said second air chamber, so as to selectively permit and inhibit the elastic deformation of said second flexible diaphragm.

8. A fluid-filled elastic mount for flexibly connecting two members, comprising;
  a first support member and a second support member which are respectively fixed to the two members to be flexibly connected, and which are spaced apart from each other in a load-receiving direction in which vibrations are supplied to the elastic mount;
  an elastic body interposed between said first and second support members for elastically connecting the first and second support members;
  a partition structure supported by said second support member so as to extend in a direction substantially perpendicular to said load-receiving direction;
  said elastic body at least partially defining a pressure-receiving chamber disposed on one of opposite sides of said partition structure on the side of said first support member, said pressure-receiving chamber being filled with a non-compressible fluid, a pressure of said fluid in said pressure-receiving chamber changing due to elastic deformation of said elastic body upon application of the vibration in said load-receiving direction;
  means for defining a first equilibrium chamber disposed on the other side of said partition structure remote from said pressure-receiving chamber and filled with said non-compressible fluid, said means for defining a first equilibrium chamber including a first flexible diaphragm which is elastically deformable so as to permit a volumetric change of said first equilibrium chamber to absorb a change in a pressure of said fluid within said first equilibrium chamber;
  means for defining a first orifice passage which communicates with said pressure-receiving chamber and said first equilibrium chamber so as to permit flow of said fluid therebetween;
  a resilient member disposed on one of opposite sides of said first flexible diaphragm remote from said first equilibrium chamber and having a biasing force toward said first flexible diaphragm, said resilient member having a first position for contact with said first flexible diaphragm under said biasing force thereof for inhibiting elastic deformation of the first flexible diaphragm, and a second position in which said resilient member is spaced apart from said first flexible diaphragm against said biasing force, to thereby cooperate with said flexible diaphragm to define therebetween a first air chamber for permitting the elastic deformation of the first flexible diaphragm;
  pressure control means for selectively applying an atmospheric pressure of the atmosphere to said resilient member to place said resilient member in said first position, and a sub-atmospheric pressure lower than said atmospheric pressure to place said resilient member in said second position against the biasing force thereof, so as to inhibit and permit the elastic deformation of the first flexible diaphragm, respectively;
  means for defining a second equilibrium chamber disposed on said other side of said partition structure remote from said pressure-receiving chamber and formed independently of said first equilibrium chamber, said second equilibrium chamber being filled with said non-compressible fluid, said means for defining a second equilibrium chamber including a second flexible diaphragm which is elastically deformable so as to permit a volumetric change of said second equilibrium chamber to absorb a change in pressure of said fluid within a said second equilibrium changer; and
  means for defining a second orifice passage which communicates with said pressure-receiving chamber via said first orifice passage, and which cooperates with said first orifice passage to permit flow of said fluid between said pressure-receiving chamber and said second equilibrium chamber, said first orifice passage has a ration of a cross sectional area thereof to a length thereof, which ration is higher than that of said second orifice passage, said non-compressible fluid flowing substantially only through said first orifice passage when said resilient member is placed in said second position, and through the first and second orifice passages when said resilient member is placed in said first position.

9. A fluid-filled elastic mount according to claim 8, wherein said first air chamber is exposed to the atmosphere.

10. A fluid-filled elastic mount according to claim 8, wherein said resilient member consists of a coned disc spring.

11. A fluid-filled elastic mount according to claim 8, wherein said resilient member partially defines an air-pressure receiving chamber connected to said pressure control means.

12. A fluid-filled elastic mount according to claim 11, further comprising a rigid member which cooperates with said resilient member to define therebetween said air-pressure receiving chamber, and wherein said rigid member has an air passage communicating with said air-pressure receiving chamber, said pressure control means including an air conduit connected to said air passage for applying a selected one of said atmospheric pressure and said sub-atmospheric pressure to said air-pressure receiving chamber.

* * * * *